US011982630B2

(12) United States Patent
Harvey et al.

(10) Patent No.: US 11,982,630 B2
(45) Date of Patent: May 14, 2024

(54) METHOD AND APPARATUS FOR CLEANLINESS DETERMINATION OF AREAS AND OBJECTS VIA VIDEO MONITORING

(71) Applicant: DataGarden, Inc., Morgantown, WV (US)

(72) Inventors: Clint Matthew Harvey, Morgantown, WV (US); John Edward Moody, Morgantown, WV (US)

(73) Assignee: DATAGARDEN, INC., Morgantown, WV (US)

( * ) Notice: Subject to any disclaimer, the term of this patent is extended or adjusted under 35 U.S.C. 154(b) by 439 days.

(21) Appl. No.: 17/242,890

(22) Filed: Apr. 28, 2021

(65) Prior Publication Data

US 2021/0341395 A1 Nov. 4, 2021

Related U.S. Application Data

(60) Provisional application No. 63/020,748, filed on May 6, 2020, provisional application No. 63/017,246, filed on Apr. 29, 2020.

(51) Int. Cl.
*G01N 21/94* (2006.01)
*G06T 7/00* (2017.01)
(Continued)

(52) U.S. Cl.
CPC .......... *G01N 21/94* (2013.01); *G06T 7/0002* (2013.01); *G06V 20/35* (2022.01); *G01N 2021/889* (2013.01); *G06T 2207/30168* (2013.01)

(58) Field of Classification Search
CPC .............. G01N 21/94; G01N 2021/889; G06T 7/0002; G06T 2207/30168; G06V 20/35; G05B 23/0283
See application file for complete search history.

(56) References Cited

U.S. PATENT DOCUMENTS 5,756,885 A * 5/1998 Poku ...................... G01N 13/02
73/104
5,860,285 A * 1/1999 Tulpule .................... F24F 11/49
62/127
(Continued)

FOREIGN PATENT DOCUMENTS

CN 102687154 A 9/2012
CN 104135965 A 11/2014
(Continued)

*Primary Examiner* — Xuemei G Chen
(74) *Attorney, Agent, or Firm* — Murphy, Bilak & Homiller, PLLC

(57) ABSTRACT

The present invention generally relates to assigning and reporting the cleanliness of objects and areas, and particularly relates to utilization of object and area cleanliness states as determined by the opposing processes of cleaning and dirtying detected through various methods to provide an indication of the state of cleanliness potentially utilized to alter the process of cleaning and/or dirtying to reach a desired state of cleanliness. Detection of the cleaning and dirtying operations can be performed automatically through image processing and behavior detection of still images/video indicating the activity taking place in the area of interest and time. The state of cleanliness can then be reported to interested parties as textual reports and/or augmented reality overlays on still images/video.

22 Claims, 7 Drawing Sheets

(51) Int. Cl.
*G06V 20/00* (2022.01)
*G01N 21/88* (2006.01)

(56) References Cited

U.S. PATENT DOCUMENTS

| | | | |
|---|---|---|---|
| 2003/0159051 A1 | 8/2003 | Hollnagel | |
| 2010/0042013 A1 | 2/2010 | Cuesta et al. | |
| 2010/0328450 A1* | 12/2010 | Wagner | D06F 34/18 |
| | | | 348/135 |
| 2012/0173274 A1* | 7/2012 | Rensvold | G08B 21/245 |
| | | | 705/2 |
| 2013/0206177 A1* | 8/2013 | Burlutskiy | A47L 9/2826 |
| | | | 15/319 |
| 2014/0122186 A1* | 5/2014 | Hurst | G06Q 10/0639 |
| | | | 348/150 |
| 2014/0232662 A1* | 8/2014 | Duesterhoft | G06F 3/03545 |
| | | | 345/173 |
| 2015/0228182 A1* | 8/2015 | Bolling | G08B 23/00 |
| | | | 340/573.1 |
| 2017/0091691 A1* | 3/2017 | Adam | G06Q 10/06313 |
| 2017/0191006 A1* | 7/2017 | Herzog | C11D 3/3947 |
| 2017/0276587 A1* | 9/2017 | Dong | H04M 1/725 |
| 2018/0104015 A1* | 4/2018 | Bryant | A61B 50/13 |
| 2018/0319045 A1* | 11/2018 | Matsumura | B23K 26/02 |
| 2019/0130554 A1* | 5/2019 | Rothberg | G06T 7/0002 |
| 2020/0374682 A1 | 11/2020 | Newman et al. | |
| 2020/0388403 A1 | 12/2020 | Boulos et al. | |
| 2021/0004996 A1* | 1/2021 | Murillo | G06T 19/006 |
| 2021/0071897 A1* | 3/2021 | Casa | G05B 23/024 |
| 2021/0125322 A1* | 4/2021 | Ventimiglia | G07C 5/0825 |
| 2021/0180810 A1* | 6/2021 | Wright | F24F 11/64 |
| 2022/0198195 A1 | 6/2022 | Russo et al. | |
| 2023/0120290 A1* | 4/2023 | Baarman | G16H 10/65 |
| | | | 15/3 |

FOREIGN PATENT DOCUMENTS

| | | |
|---|---|---|
| CN | 207881862 U | 9/2018 |
| CN | 109447199 A | 3/2019 |
| CN | 210293492 U | 4/2020 |
| DE | 60133653 T2 | 5/2008 |
| ES | 2664241 T3 | 4/2018 |
| GB | 2459565 A | 11/2009 |
| JP | 2005502961 A | 1/2005 |
| JP | 2012037102 A | 2/2012 |
| JP | 2012235415 A | 11/2012 |
| KR | 20120036638 A | 4/2012 |
| WO | 0018290 A1 | 4/2000 |
| WO | 2011151806 A1 | 12/2011 |

\* cited by examiner

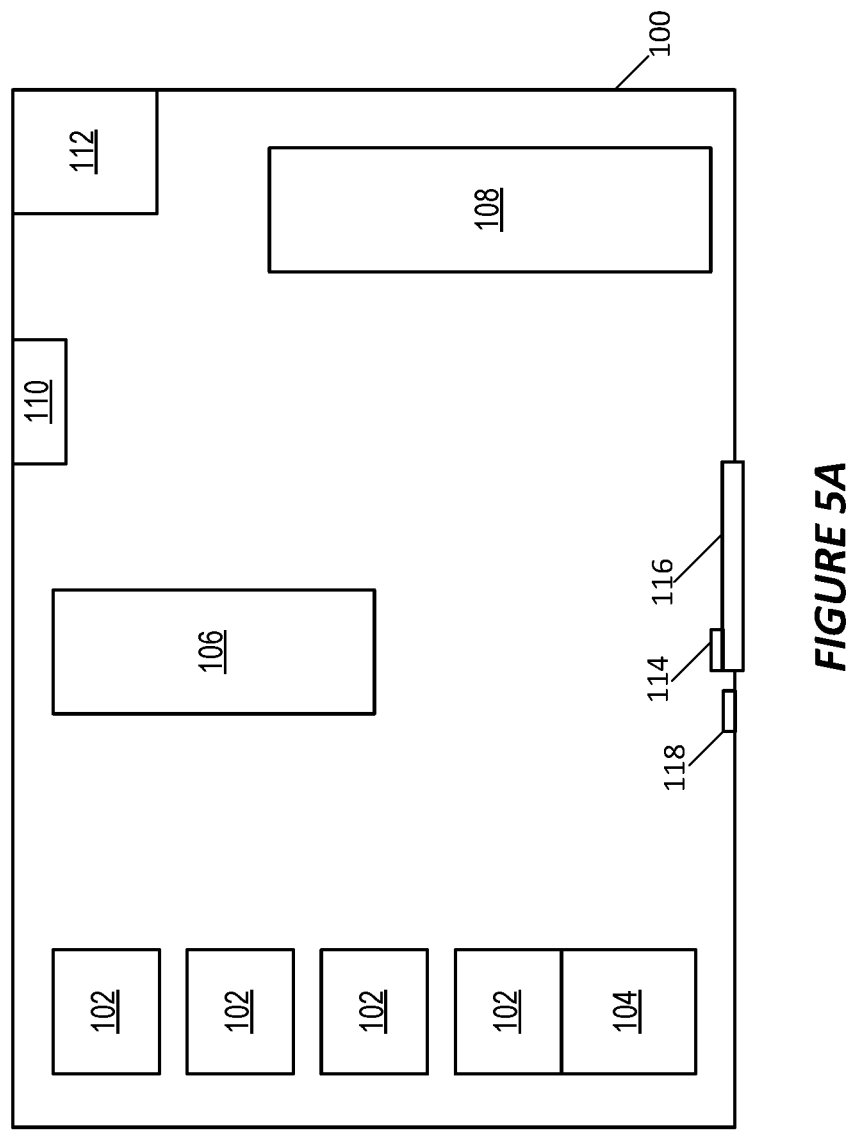

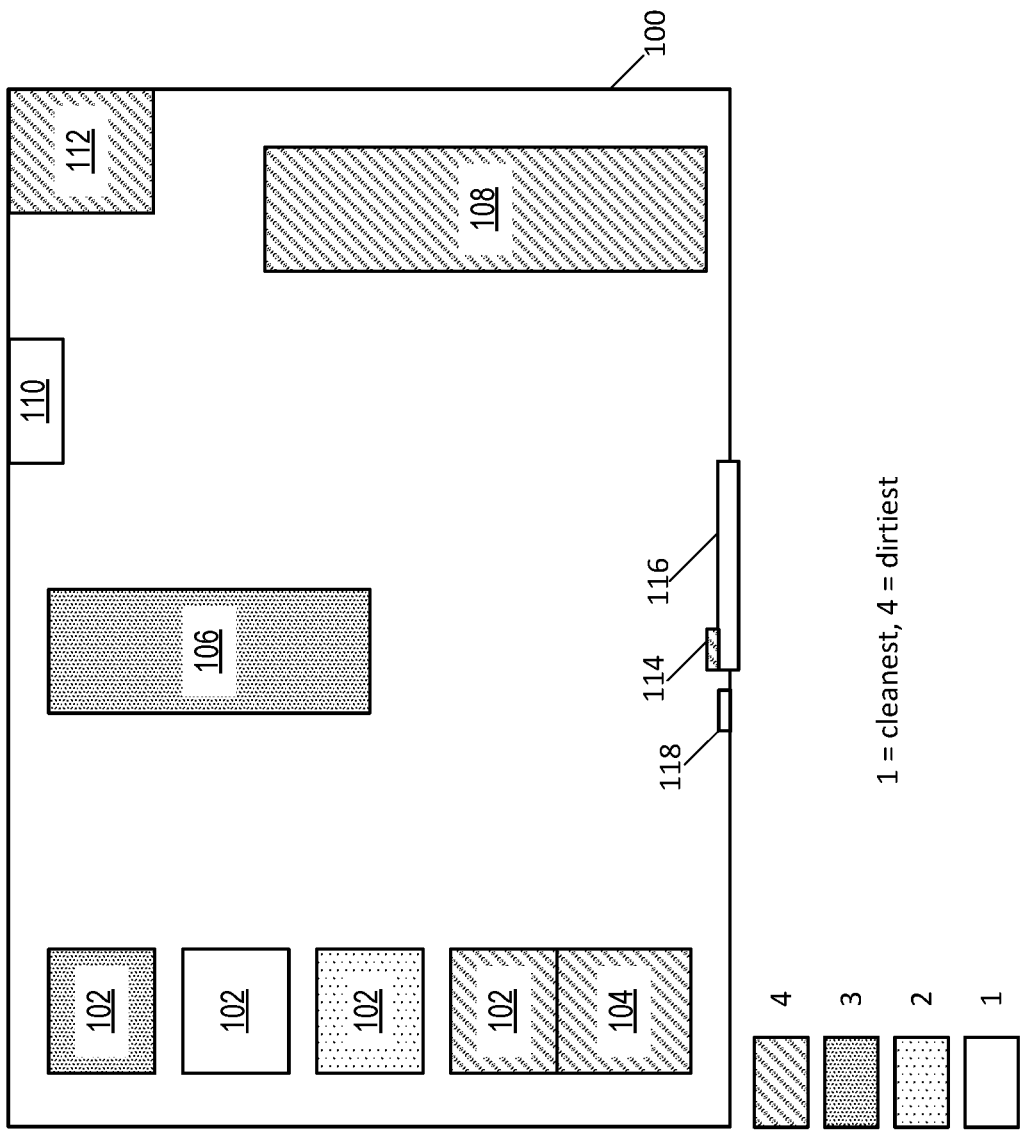

METHOD AND APPARATUS FOR CLEANLINESS DETERMINATION OF AREAS AND OBJECTS VIA VIDEO MONITORING

RELATED APPLICATIONS

This application claims priority to U.S. Provisional Application Nos. 63/017,246 filed 29 Apr. 2020 and 63/020,748 filed 6 May 2020. The entire contents of each aforementioned application is incorporated herein by reference.

TECHNICAL FIELD

A method and apparatus provide an indication of the cleanliness of a physical object or area, based on the detection of events involving the physical object or area, such as by means of visual analytics.

BACKGROUND

Cleanliness stands as an area of increasing concern, where the "cleanliness" in question, for example, relates to chairs, doors or doorknobs, medical waiting rooms or the various objects in such rooms, such as chairs, water fountains, and countertops. Having an accurate sense of the cleanliness of an area or object of interest at any given time is not possible from simple inspection, because contamination may or may not be visible.

SUMMARY

The cleanliness of physical objects or areas, such as chairs, desks, and other surfaces in a medical waiting room, changes over time, or with respect to activities involving those physical objects or areas, and methods and apparatus disclosed herein provide for, among other things, an indication of the estimated cleanliness of a physical object or area. An example cleanliness monitoring system receives a video feed from a monitoring camera, or data derived from the video feed, recognizes certain activities directed to the monitored object or area as being cleaning or dirtying activities, makes corresponding adjustments to the estimated cleanliness of the monitored object or area, and updates the output indication accordingly.

One embodiment disclosed herein is a cleanliness monitoring system that includes interface circuitry and processing circuitry. The processing circuitry is configured to set a cleanliness estimate for a physical object or area to an initial value, change the value of the cleanliness estimate responsive to the passage of time or detected events involving the physical object or area, or both, and output, via the interface circuitry, an indication of the value of the cleanliness estimate.

According to another embodiment, a method performed by a computer system includes setting a cleanliness estimate for a physical object or area to an initial value and changing the value of the cleanliness estimate responsive to least one of the passage of time, or detected events involving the physical object or area. The method further includes outputting an indication of the value of the cleanliness estimate.

In another example embodiment, a cleanliness monitoring system includes interface circuitry and processing circuitry. The processing circuitry is configured to initialize the value of a cleanliness estimate for a physical object or area, recognize cleaning activities and dirtying activities that occur over time and are directed to the physical object or area. The recognition is based on video analytics derived from video images associated with video monitoring of the physical object or area. For each recognized dirtying activity, the processing circuitry is configured to change the value of the cleanliness estimate to reflect the recognized dirtying activity, unless the value is already at a limit reflecting a dirtiest condition of the physical object or area. Further, the processing circuitry is configured to output, via the interface circuitry, an indication of the current value of the cleanliness estimate.

According to another example embodiment, a cleanliness monitoring system includes interface circuitry and processing circuitry. The processing circuitry is configured to initialize the value of a cleanliness estimate for a physical object or area, detect activities involving the physical object or area, based on evaluating information received via the interface circuitry. The information corresponds to one or more sensors used to monitor for activities involving the physical object or area, and the processing circuitry is further configured to classify respective ones of the detected activities as dirtying activities or cleaning activities and change the value of the cleanliness estimate responsive to the detected activities, where the changes depend on the classifications of the detected activities. Still further, the processing circuitry is configured to output an indication of the cleanliness estimate, where the indication reflects the current value of the cleanliness estimate.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 5a and 5b are block diagrams of an example area for which cleanliness monitoring is used, and depicts example estimated states or conditions of cleanliness for respective objects within the area.

DETAILED DESCRIPTION

Figure 1:
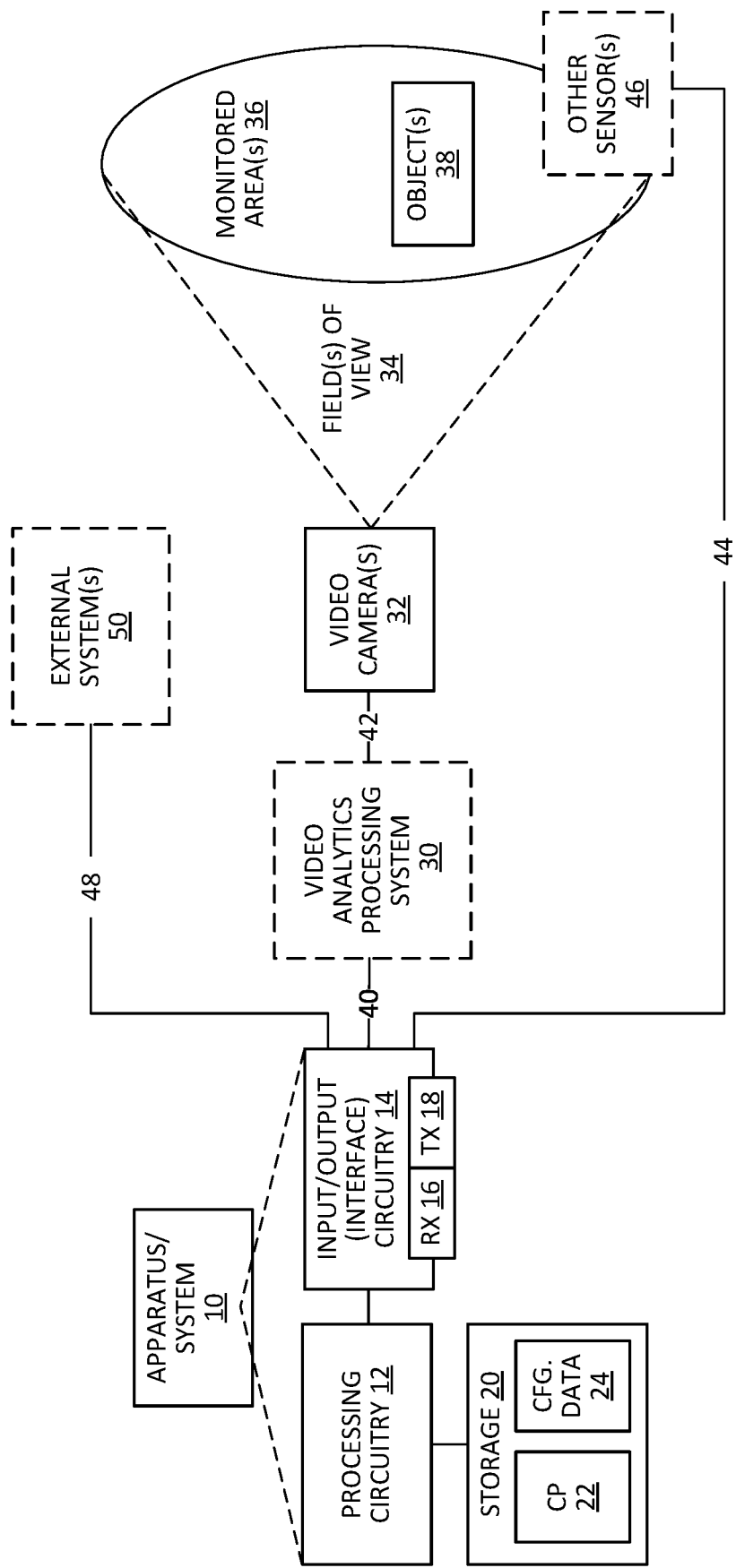
FIG. 1 is a block diagram of a cleanliness monitoring system, according to one embodiment.

In example embodiments, an apparatus and a method provide for determining and indicating the state of cleanliness of an area or objects within an area. State-of-cleanliness determinations are based on, for example, the passage of time or monitored activity within the area, or both the passage of time and monitored activity. Activity detection and characterization involves analyzing still or video images, in one or more embodiments.

The cleanliness, e.g., the state of cleanliness, of an area or object is determined through the opposing processes of cleaning and dirtying. When these two processes operate on the cleanliness state over time, one increasing cleanliness and the other decreasing it, the cleanliness of an area or objects can be determined at any given time. This state then can serve as the basis for informing interested parties of the cleanliness state, to allow for altering of the cleaning and dirtying processes to achieve a desired cleanliness state.

In one or more embodiments of a cleanliness monitoring system or a method of cleanliness monitoring, cleaning and dirtying operations are "detected" based on manual entry of cleaning and dirtying events, e.g., computer entry by a human operator. Additionally, or alternatively, cleaning operations are detected automatically, or at least semi-automatically, e.g., through analysis of still or video images of the involved areas/objects. Activity detection may include detecting particular types of cleaning or dirtying events and may include detecting a level or duration of activity.

Reporting of the state of cleanliness of areas/objects uses any one or more of various mechanisms, including textual reports or augmented reality (AR) display of results. AR display of cleanliness conditions for an object or area may be based on generating information and overlaying the information on still or video images. For example, a cleanliness monitoring system assigns levels of cleanliness to corresponding visually identifiable indicators, such as scaled numerical values, colors, patterns, etc., and outputs such information as graphical overlay data, for overlay on an image of the monitored object(s) or area(s).

The concept of cleanliness in relation to objects and areas is important for a variety of users for multiple reasons related to business activities. Cleanliness, as related to certain aspects of this disclosure, may be defined as a state and/or states with the capability to be assigned various calculated numerical values related to the presence/absence of a defined quantity (e.g., contaminant, air freshener, fertilizer, etc.). These numerical values are calculated, for example, based on time and observed activity in an area of interest or directed to one or more objects of interest.

Given the ability to report cleanliness to system users, the users can then utilize the information to alter cleaning and/or dirtying processes to achieve the level of cleanliness desired. For example, in a medical office environment, tracking an estimate of the cleanliness of objects in a waiting room or other areas helps ensure patient safety. Areas/objects of interest are "entered" into a cleanliness monitoring system according to an example embodiment, with the system using formulas/parameters for calculating cleanliness of the areas/objects based on detected cleaning operations, detected dirtying operations, and the passage of time. Correspondingly, the example system maintains a current estimate of the cleanliness of areas/objects, updating the estimate responsive to its detection of the cleaning and dirtying events.

The detection of events can be performed either through manual methods, such as a user marking an area as having been cleaned or having been contaminated by a sick patient. Additionally, or alternatively, the system automatically detects events through image processing of still images/video. As these events are detected and cleanliness is calculated, reporting of the cleanliness of the office could then be performed through written reports, indicative overlays over still images/video, and or alarms. When reports lead to a user desiring to increase area cleanliness, the user can then increase cleaning frequency, order immediate cleaning, or reduce dirtying events by reducing the number of people in the area over time.

Other examples instances where knowing the cleanliness state of area/objects might include: (a) healthcare to prevent spreading of contagious diseases, (b) contamination due to chemical/radiological substances, (c) spreading of fertilizer/pesticides over crops, (d) inspection of machinery and maintenance activities, (e) guard activities, (f) patient monitoring, and (g) medication dispensing.

FIG. 1 illustrates one embodiment of a cleanliness monitoring or tracking system 10, which is also referred to as a cleanliness monitoring apparatus. The example cleanliness monitoring system 10 ("system 10") comprises processing circuitry 12 and input/output circuitry 14 for coupling input information or signaling into the processing circuitry 12 and output information or signaling from the processing circuitry 12. The input/output circuitry 14 is also referred to as interface circuitry 14, and in the example depiction the interface circuitry 14 includes receiver circuitry 16 and transmitter circuitry 18, for receiving and transmitting information, such as image data or other types of data or signaling.

The processing circuitry 12 comprises fixed circuitry, programmatically-configured circuitry, or a mix of fixed and programmatically-configured circuitry. Non-limiting examples include one or more microprocessors, digital signal processors, field programmable gate arrays, application specific integrated circuits, or other digital processors. The processing circuitry 12 includes or is associated with storage 20, which provides, for example, short-term working memory for program execution and data-processing. Additionally, or alternatively, the storage 20 provides longer-term storage for computer-program instructions, for execution by the processing circuitry 12, and may store various items of operational or configuration data. For example, the storage 20 comprises one or more types of computer-readable media, such as DRAM, SRAM, FLASH, SSD, etc.

In at least one embodiment, the storage stores computer-program instructions that, when executed by the processing circuitry, causes the system to carry out the method(s) described herein. That is, in at least one embodiment, one or more processors included in the cleanliness monitoring system are specially adapted to perform the operations described herein, based on their execution of computer program instructions comprised in one or more computer programs 22 ("CP" in the diagram) held in the storage 20. The storage 20 may also hold one or more items of configuration data 24, e.g., data about areas or objects to be monitored, the actions to be taken by the system 10 responsive to detected activities, information about the types and sources of signaling to be received by the system 10 or to be output by the system 10, etc.

The cleanliness monitoring or tracking system may also be referred to as an area monitoring system, and it may be implemented as or embodied at least in part in a computer server executing computer program instructions implementing the method operations described herein.

The system 10 in the example arrangement of FIG. 1 interfaces with one or more sensors that are operative for monitoring human activities or other events that occur in one or more areas of interest, such as rooms or areas in a healthcare facility that may contain chairs, works surfaces, or other objects of interest. Example sensors include video cameras or other imaging devices, which may be two-dimensional or three-dimensional. Unless otherwise noted, the term "camera" broadly refers to imaging devices that use visible or non-visible light for imaging an area of interest.

In at least some embodiments, the system 10 includes or at least interfaces with a heterogenous mix of sensor types, e.g., one or more video cameras, along with one or more other types of sensors, such as temperature, humidity, or other sensors that monitor one or more environmental parameters that play a role in estimating the cleanliness of objects within an environment or in estimating the rate at which cleanliness degrades. Other supplemental sensor types include, for example, motion sensors or contact sensors or vibration sensors, to detect or verify that cleaning activities were carried out, or to assess whether or to what extent objects of interest within the environment are touched, handled, or otherwise contacted by humans.

In the particular example of FIG. 1, the system 10 includes or is associated with a video analytics processing system 30, which receives image data—still or video image data—from a camera 32 having a field-of-view (FoV) 34 that encompasses all or part of one or more monitored area(s) 36 that may include one or more objects 38 of interest. The video analytics processing system/sub-system 30 outputs processed data 40—video-analytics data—based on processing an image data 42 provided by the camera 32, e.g., a video feed or periodically updated still images.

The system 10 may also receive information 44 from one or more other types of sensors 46, such as card-swipe systems or other access-control systems, humidity sensors, etc. Generally, the other sensor(s) 46 provide supplemental information that provides for more reliable detection of cleaning or dirtying events involving the area 36 or objects 38 within the area 36, or provides for verification of such events, or provides for more accurate classification of such events. The system 10 also may provide information 48 to one or more external systems 50, such as electronic reporting of cleanliness estimates for the monitored area(s) 36 and/or object(s) 38.

In an example implementation of the system 10, the system 10 estimates the "cleanliness" of an object 38, where the estimate may be a continuous-vale estimate, such as a sliding-scale value, or may be a quantized estimate, such as one among a limited number of "states." The cleanliness estimates may also be implemented as "cleanliness scores," such as one of a "high," "medium," and "low" scores or as "cleanliness conditions," such as one of "good," "fair," or "poor" conditions. Synonymous or related schemes include "cleanliness grades" or "sanitation states." In all such examples, the system 10 may be understood as maintaining a value representing a "cleanliness estimate" for the object 38, where the "maintaining" involves adjusting the value, e.g., as a function of time or responsive to detected events, such that the current value at any given time corresponds to the current estimate of cleanliness for the object 38.

In at least one example, the system 10 estimates the cleanliness value for an object 38 and outputs a corresponding indication, such as color coding information for superposition of a mask or other indictor on a display screen showing the object 38 in question and/or outputting reporting information, either as signaling to another system or in a human-readable format. The estimate may be relative to a starting state, such as an initial or default value and the estimate may be based on detected activity or the passage of time or some combination of both. For example, the external system(s) 50 include one or more user computers having corresponding display screens and the information 48 output by the system 10 comprises an electronic indication of the value of the cleanliness estimate for the object 38. Such information 48 may comprise video overlay information, textual reporting, etc.

Examples of "detected activity" influencing the cleanliness-value estimation include current and/or historical values of human activity directly involving the object 38 or at least within the area 36 of interest, e.g., the number of people that have cycled through a waiting room in a doctor's office over the last ten minutes, the last hour, etc. To the extent that estimation of the cleanliness value depends on an "aging" function—e.g., where an object 38 is presumed to become dirtier over time—the aging function may be more or less aggressive as a function of ongoing or historical human activity involving the object 38 or at least the area 36 of interest.

In at least some embodiments, the system 10 maintains differentiated information for estimating the cleanliness of multiple objects within a monitored area. Consider an example where the chairs adjacent a check-in area of a waiting room are used frequently—as detected via video monitoring—while one or more chairs remote from the check-in area receive little if any use. The cleanliness values for the "busier" chairs degrade more rapidly than the cleanliness values for the chairs that are not used or used only infrequently. A video overlay produced by the system 10 or produced using information output from the system 10 could apply color coding, intensity, or other visual highlighting to indicate the current cleanliness estimates for all objects 38 of interest in the monitored area 36—e.g., chairs, countertops, water fountains, doors, handrails, etc.

As noted, the system 10 in one or more embodiments includes a video analytics system 30, for processing image data, such as video images, of one or more areas 36 of interest and objects 38 within them. Alternatively, the system 10 communicatively couples to the video analytics system 30, which is implemented separately—e.g., on a different computer server or separate computing platform.

Not all embodiments of the system 10 necessarily use "aging" to compute current cleanliness estimates for objects 38 of interest. Instead, in at least one embodiment, the system 10 estimates the cleanliness of an object 38 at any given time based on historical activity—i.e., detected activity that bears on the cleanliness of an object 38. For a countertop, for example, relevant activity includes detecting that one or more persons have leaned on or otherwise touched the counter or detecting that more than a threshold number of people have been serviced at the counter over some monitoring interval. Video analytics provides one mechanism for activity detection and may be supplemented with one or more additional types of sensors, for more particularized activity detection and more nuanced cleanliness estimation. For example, touch or vibration sensors offer direct indications of whether or to what extent an object of interest is contacted by humans proximate to the object.

Further, at least some of embodiments of the system 10 offer an important safeguard for the health and safety of persons that use the facilities being monitored. Namely, the system 10 uses activity-detection information to detect cleaning activities within a monitored area 36. For example, the system 10 performs video analytics processing on a video feed for the monitored area 36, or it receives processed data from an associated video-analytics system, for recognition of cleaning activities directed to objects 38 of interest, e.g., wiping down a surface, the spraying of disinfectants, mopping, etc.

Upon detecting a "cleaning" activity involving an object 38 of interest, the system 10 in one or more embodiments resets or initializes the cleanliness estimate of the object, e.g., to a default or highest value. The estimate then degrades as a function of time and/or newly detected "degrading" activity involving the object 38. Here, "degrading" activity is non-cleaning activity that involves the object 38, such as random persons touching, using, or leaning on the object 38. At least some embodiments of the system 10 use supplemental information for verifying cleaning activity. As an example, in addition to requiring the video analytics to classify detected activity as "cleaning" activity rather than "degrading" activity, the system 10 further requires one or more additional verifications.

In one example, the system 10 does not classify detected activity as "cleaning" activity unless it occurs in conjunction with another verification input, such as a card swipe from an employee designated as a janitorial service employee at an access point associated with the involved area. Card-swipe signaling, or other information is received by the system 10 via its interface circuitry 14, for example. Additionally, or alternatively, the system 10 requires that the person engaged in the ostensible cleaning activity—i.e., activity that "looks" like cleaning activity but requires further verification—be wearing a particular type of uniform or be wearing an identifying badge or other defined indicia that is associated with cleaning crews or other designated personnel.

As another example, detecting "cleaning activity" comprises detecting ultraviolet (UV) light treatments or other disinfecting activities, based on video monitoring of the involved area 36 and/or based on receiving signaling from external systems 50. For example, the system 10 may tie in with HVAC or other building control systems and may receive data or signaling indicating the activation of UV lights for disinfecting countertops and other surfaces that are being monitored for cleanliness.

Thus, in one or more embodiments, a system 10 performs a method of operation comprising estimating a cleanliness value for an object of interest and outputting an indication of the estimated cleanliness value. Outputting the indication comprises, for example, outputting data or signaling for applying a visual highlight to an image of the object 38, where the visual highlight indicates the estimated cleanliness value. As an example, the object 38 is a countertop in a waiting room and the system 10 outputs video information or signaling for overlaying a semitransparent color mask on an image of the countertop within a live video feed or static display of the countertop and its surrounding environment.

Estimating the cleanliness values comprises, for example, assigning a default or starting cleanliness value to the object and then degrading that value—either continuously or stepwise—as a function of time and/or as a function of detected "degrading" activity. In the countertop example, degrading activity may be detecting (via video monitoring) that people have touched or leaned on the counter since its last cleaning, etc. Additionally, or alternatively, the system 10 degrades the estimated cleanliness as a function of time—an "aging" factor. In one or more embodiments of the system 10, the aging made more aggressive or less aggressive in dependence on detecting relevant human activity and/or in dependence on monitoring environmental parameters, such as ambient humidity, temperature, etc.

Figure 2:
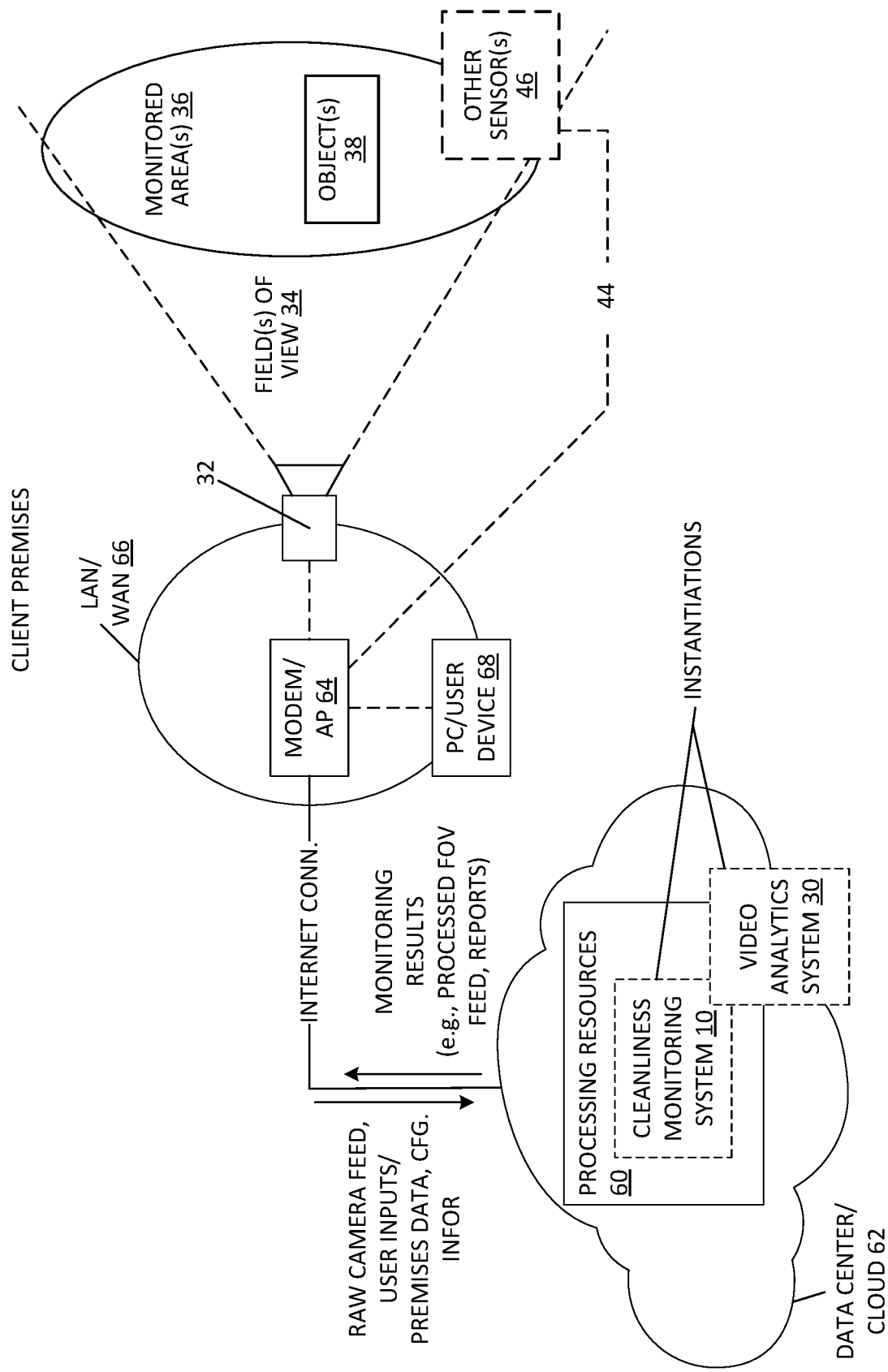
FIG. 2 is a block diagram of a cleanliness monitoring system, according to another embodiment.

FIG. 2 depicts another example embodiment of a cleanliness monitoring or tracking system 10, where the processing circuitry supporting the cleanliness tracking is cloud-based, e.g., implemented using the processing resources 60 of a data center 62 that is remote from the client premises where one or more monitoring camera(s) 32 are located.

The system 10 is virtualized within the data-center computing systems, for example. The supporting video-analytics processing may also be virtualized within the processing resources 60 of the data center 62. There may be multiple instantiations of the system 10, e.g., on a per camera basis or on a per client basis, such as where one or more cameras 32 associated with a particular address or client account are managed together as a group.

Thus, in at least one embodiment, an instance of the system 10 may receive video data from one or more cameras 32 that are remote from the system 10. FIG. 2 illustrates an example scenario or configuration, where an internet-based connection between a camera 32 and a corresponding instance of the system 10, as implemented within the processing resources 60 of a remote data center 62. Here, the processing resources 60 comprise a host computing platform, for example, which may be a virtualized server instantiated on underlying physical processing, memory, and input/output circuitry.

The example arrangement shows an example arrangement for connecting the camera 32 but the example is not limiting. Here, the camera 32 connects physically or wirelessly to a modem or other type of access point (AP) 64 at the client premises, where the client may also be referred to as a "subscriber." The modem/AP 64 provides internet-based connectivity with the cloud-hosted (cleanliness monitoring) system, e.g., in association with a LAN/WLAN 66 at the client premises. The internet connection provides the system 10 with image data acquired by the on-premises camera 32—e.g., a raw camera feed, packetized for network conveyance.

The system 10 may return monitoring results via the internet connection, e.g., processed video data having cleanliness-state masks or visual highlights superimposed on one or more objects that appear in the image data. To that end, a PC or user device 68 at the client premises (or wherever the client has internet connectivity) may be used to display the processed video data. The same user device 68 or another display device may also be used by the client to mark, tag, or otherwise highlight the object(s) 38 to be monitored, along with inputting any relevant configuration data, e.g., for storage as configuration data 24.

In at least one embodiment, the system 10 or an associated functional module provides a browser-based configuration tool to the user, which allows the user to use a web browser to configure monitoring and view monitoring results. For example, during configuration operations, the user's browser communicates with the system 10 and provides a window for viewing the camera image, along with input tools (e.g., mouse-based) for tagging objects 38 to be monitored or otherwise outlining surfaces or areas of interest within the imaged scene. Then, during "live" monitoring operations, the system 10 sends monitoring information to the browser instance running on the user's computer, where the monitoring information comprises processed video and/or reporting information regarding cleanliness statuses of the object(s) 38 being monitored.

The internet connection also provides a link for the system 10 to receive user input, such as camera make model, configuration information, desired default settings, etc. In one or more other embodiments, the same or similar functionality is delivered via dedicated software applications or apps (including responsive web applications).

One of the advantages of the cloud-based embodiment of the system 10 is that the only hardware needed at the monitoring site is a camera 32 that can be connected to the internet or otherwise communicatively coupled to the system 10. In other environments, such as environments governed by strict privacy requirements, it may make more sense to host the system 10, or specific components of the system 10, onsite with local connectivity between the camera(s) 32 and the system components (and any client computers or other image displays that are used for outputting graphical depictions of the cleanliness states of monitored objects).

For estimating or otherwise tracking the cleanliness state of an object 38, as noted above, the system 10 may apply a time-based degradation that degrades the cleanliness state value of the object over time, either continuously or stepwise. Additionally, or alternatively, the system 10 changes the cleanliness value of an object 38 responsive to detecting activities that involve the object 38. The system 10 recognizes one or more types of detected activities as "dirtying" an object 38 or otherwise decreasing its cleanliness value and recognizes one or more other types of detected activities as "cleaning" an object 38 or otherwise increasing its cleanliness value.

Activity detection may be based purely on video analytics—i.e., analyzing video data from the camera(s) 32 that image the objects 38 of interest to detect dirtying and cleaning events or activities. The events may be human activities, such as detecting when an object 38 is handled or used via video-analytics processing, and the activities may be classified as dirtying events or cleaning events. For example, a human contacting an object may be regarded as a dirtying event if no cleaning cloth or rag is detected, or if the duration of touch or characteristic movements of the human do not satisfy the classification parameters of a "cleaning" event, or when the human is not wearing a badge, indicia, or uniform indicative of janitorial staff, or when the touch-event is not coincident with the system receiving information or authentication data confirming that the detected activity is a cleaning activity.

In other embodiments, activity detection may be based on one or more other types of sensors or detection interfaces—such as interfacing with motion sensors, vibration sensors, contact sensors, etc. Of course, the system 10 need not interface directly with any sensor; as it need only receive the sensor data or information derived therefrom. For example, the system 10 may interface with a building management system or other external systems 50 that provide additional data for more accurately estimating and tracking the cleanliness of objects 38. One or more embodiments of the system 10 rely on video analytics in combination with or supplemented by other signaling or information, such as badge-swipe or other authentication information from an access-control system that monitors or restricts personnel access to the monitored area(s), or such as disinfectant-spray or misting systems, UV-light sanitizing systems, etc.

Highlighted video data—i.e., video data representing an imaged scene with enrichments to provide visual overlays or other visual highlighting that indicates the estimated cleanliness value of one or more objects in the imaged scene—can be regarded as a "heat map" that uses colors, intensities, or other visual highlighting to depict the estimated cleanliness of an object 38 in the imaged scene. A user of the system 10 may, therefore, access the system 10 locally or remotely, to obtain a heat map for areas 36 of interest. Such data may be provided to a desktop computer, a laptop computer, or a personal computing device, such as a tablet or smartphone. This capability means, for example, that a business owner can use her smart phone to view objects 38 that are subject to cleanliness-state monitoring and be presented with onscreen information indicating the current estimates of cleanliness for the object(s) and, in at least some embodiments, with a scrollable or browsable "history" of cleanliness estimates.

Along the same lines, in one or more embodiments of the system 10, the system 10 logs the video data or at least logs video data corresponding to detected events. For example, the system 10 may index cleaning events, allowing a user of the system 10 to access and review all activities that were classified as cleaning activities. The review capability serves as an audit function, which may be critical for regulatory compliance. Further, the review capability provides the user (e.g., a business owner or staff supervisor) with a ready mechanism for determining whether cleanings are thorough or follow established protocol or, even whether a purported cleaning actually occurred. In this latter case, the person responsible for cleaning an object 38 may be required to keep an electronic logbook of cleanings, which may be separate from the system 10. Because of the indexed video record maintained by the system 10 in one or more embodiments, however, a supervisor can review the video history for correspondence with logged cleaning activity.

In an example method, the system 10 detects activities involving an object 38 of interest, wherein the "object" of interest is a thing, place, zone, or area of interest that is monitored via video surveillance. That is, in its broadest sense, the word "object" may connote an area; however, FIGS. 1 and 2 distinguish areas 36 from objects 38 for clarity of discussion regarding imaged scenes corresponding to the FoV(s) of the camera(s) 32 being used for cleanliness monitoring. In any case, the activities are detected at least in part via analysis of the video data acquired via the video monitoring of the object 38. In one or more embodiments, the system 10 is configured to receive raw video data and perform the video-analytics processing, based on incorporating or implementing a video-analytics system 30 for such processing. In other embodiments, the video-analytics processing system 30 is separate and system 10 is configured to receive the processing results from or otherwise cooperate with the video-analytics processing system 30, e.g., for the receipt of processed data from the video-analytics processing system 30.

Continuing the method example, the system 10 changes its estimate of the cleanliness of an object 38 of interest as a function of the detected activities. Activities that are not expressly detected or indicated as cleaning activities may be regarded as dirtying or degrading activities that lower the cleanliness value of the object 38, while activities that are recognized and/or confirmed as cleaning activities raise the cleanliness value. In at least one implementation, there is a maximum cleanliness value, and it may be used as an initial or starting value. For example, the detection of a cleaning event restores an object 38 to the starting value of cleanliness or some other predefined value, and it degrades from there, as a function of detected dirtying activities and/or as a function of time, which assumes that the cleanliness degrades over time.

Figure 3:
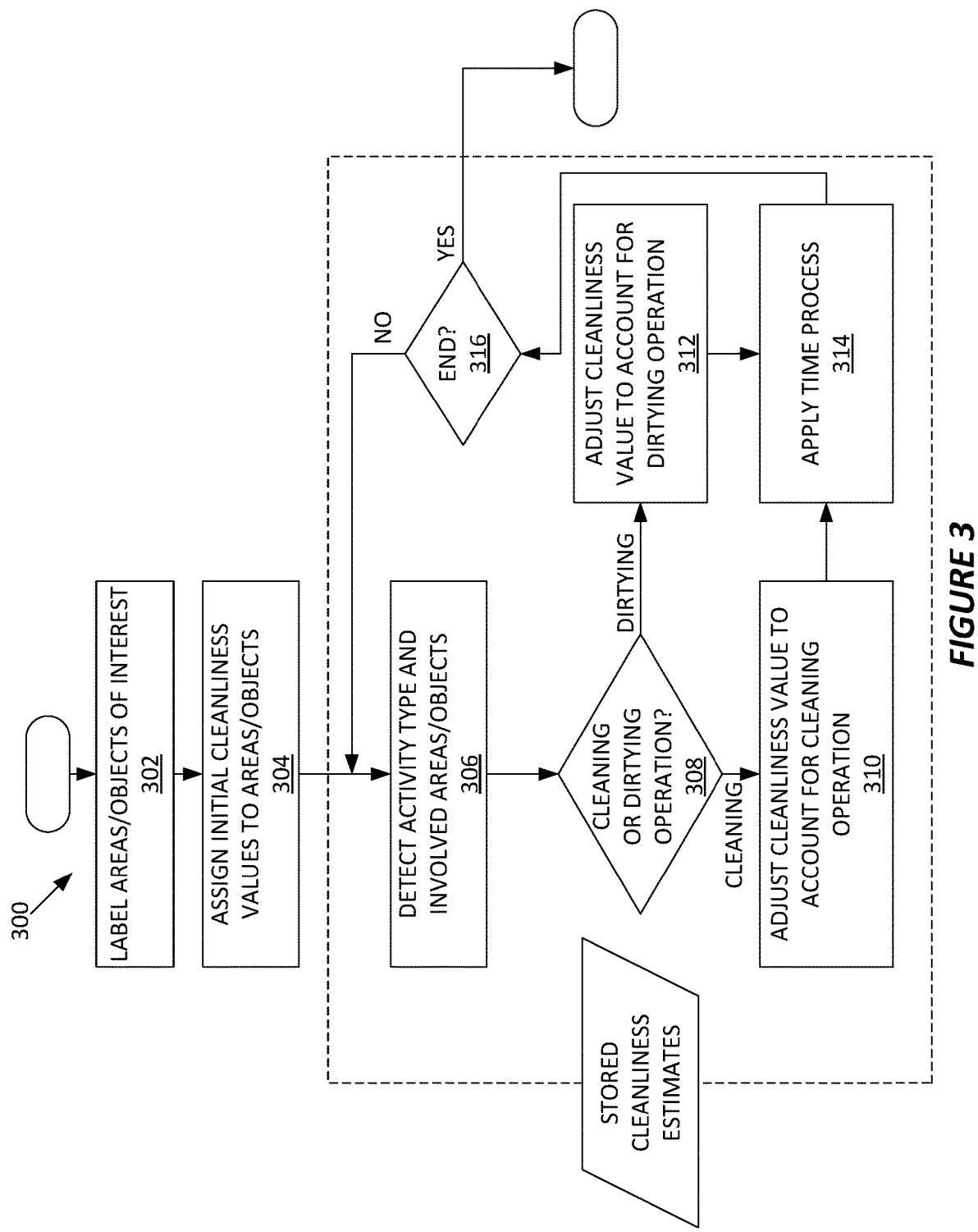
FIG. 3 is a logic flow diagram of a method of cleanliness monitoring, according to one embodiment.

FIG. 3 illustrates a method 300 of cleanliness monitoring, according to one embodiment. The system 10 of FIG. 1 or FIG. 2 may be configured to carry out the method 300, or it may be carried out via another appropriately-configured computer apparatus.

The method 300 includes labeling areas/objects of interest (Block 302), e.g., based on receiving user input indicating the areas 36/objects 38 to be monitored for cleanliness. The method 300 continues with assigning initial cleanliness values to the areas 36/objects 38 (Block 304), and then looped or ongoing operations begin, based on detecting activities (Block 306)—i.e., detecting activities of one or more types and detecting the areas 36/objects 38 involved in the detected activities.

If a detected activity is classified as cleaning operation ("CLEANING" from Block 308), the method 300 includes adjusting the cleanliness value of the involved area 36/object 38, to account for the cleaning operation (Block 310). If a detected activity is classified as dirtying operation ("DIRTYING" from Block 308), the method 300 includes adjusting the cleanliness value of the involved area 36/object 38, to account for the dirtying operation (Block 312).

The processing loop in the example embodiment of the method 300 further includes applying a time process (Block 314), which can be understood as applying an aging function to the monitored area(s) 36/object(s) 38, such that the cleanliness estimates degrade over time. The processing either continues (NO from Block 316) with ongoing activity detection and aging operations (Blocks 306, 308, 310, 312, and 314), or ends (YES from Block 316).

Figure 4:
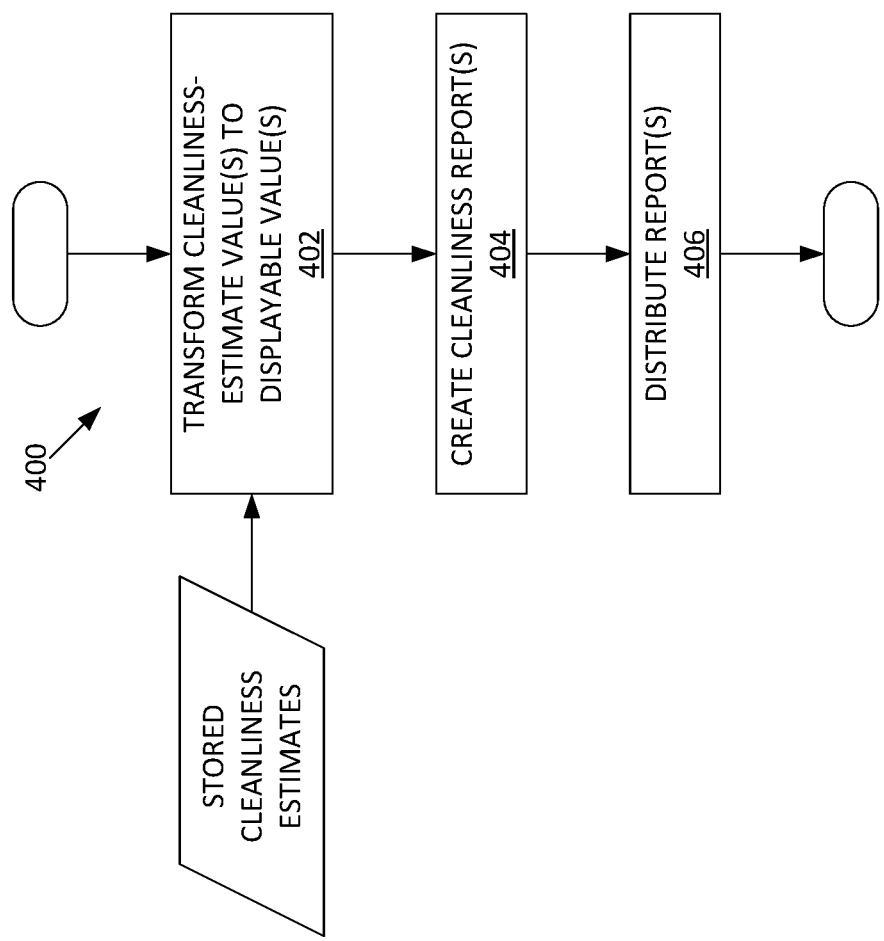
FIG. 4 is a logic flow diagram of a method of outputting an indication of a monitored cleanliness, according to one embodiment.

FIG. 4 illustrates an example method 400 that may be carried out in conjunction with performing the method 300, with the operations depicted in the method 400 representing one approach to outputting indications of estimated cleanliness.

Operations include transforming one or more cleanliness-estimate values into displayable values (Block 402), creating one or more cleanliness reports (Block 404), and distributing the one or more cleanliness reports (Block 406). For example, a system 10 has current values stored, representing the current estimated cleanliness of one or more areas 36 or objects 38, and it transforms or converts those values into one or more defined reporting formats, for outputting to one or more external systems 50.

FIG. 5a illustrates a simplified plan view of a waiting room that includes a number of chairs 102, a table 104, a sofa 106, a countertop 108, a water fountain 110, a coffee dispenser 112, a door handle 114 on a door 116, and a light switch 118. The view depicted in FIG. 5a represents, for example, a camera image.

FIG. 5b illustrates example overlay coding or marking that may be generated by the system 10 over time, to indicate changed cleanliness values for the various objects in the waiting room. In the example of FIG. 5b, there are four cleanliness values, going from 1 to 4, with 1 corresponding to a cleanest condition and 4 corresponding to a dirtiest condition.

Some of the tracked objects remain in the cleanest condition while others are marked as having dirtier condition, e.g., values of 2, 3, or 4. The changed cleanliness values arise from detecting activities involving the objects, e.g., a chair 102 that is not sat in over the monitoring period in question may remain at the starting value of cleanliness, while other chairs 102 are marked as being dirtier, in dependence on detecting the number of people that have set in them or the duration of occupancy, etc. Additionally, or alternatively, the system 10 may monitor for specific events, such as a person sneezing or otherwise engaging in an activity that is of particular concern. In such instances, the system 10 may output an alarm or other reporting information, indicating the need for immediate cleaning.

Figure 6:
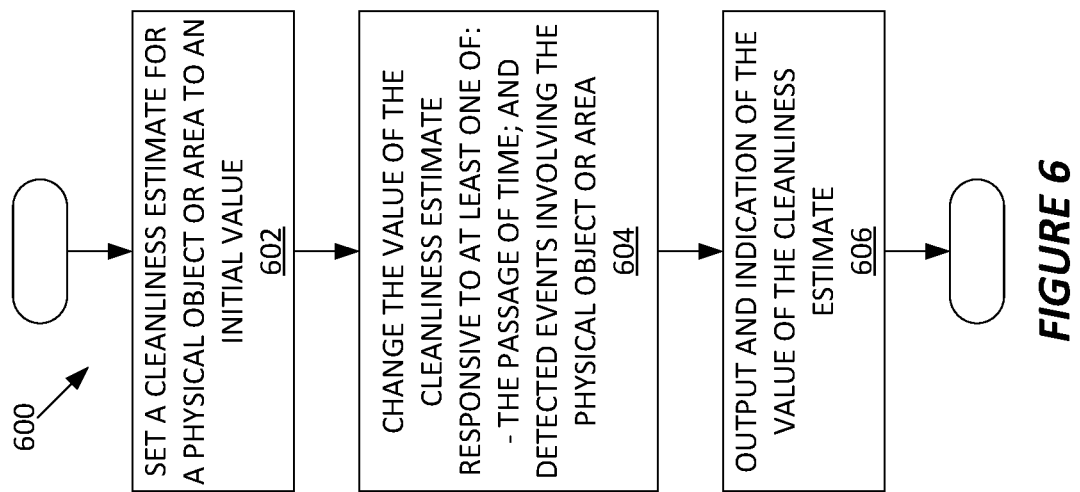
FIG. 6 is a logic flow diagram of a method of cleanliness monitoring, according to another embodiment.

FIG. 6 illustrates another embodiment of a method 600 of cleanliness monitoring performed by a computer system, such as the system 10 illustrated in FIG. 1 or FIG. 2. The method 600 includes setting (Block 602) a cleanliness estimate for a physical object or area to an initial value and changing (Block 604) the value of the cleanliness estimate responsive to least one of: the passage of time, or detected events involving the physical object or area. The method 600 further includes outputting (Block 606) an indication of the value of the cleanliness estimate. For example, the indication output at any given time reflects the then-current value of the cleanliness estimate. The indication may be output continuously or repeatedly or output on a triggered basis, such as when the value is changed.

Outputting the indication of the value of the cleanliness estimate comprises, in at least one embodiment, outputting the indication of the value of the cleanliness estimate as video overlay information, for overlaying a video or still image of the physical object or area. The video overlay information comprises, for example, a color-coded graphical overlay, where the color of the color-coded graphical overlay indicates the value of the cleanliness estimate and where the method 600 includes changing the color of the color-coded graphical overlay responsive to changing the value of the cleanliness estimate.

To change the value of the cleanliness estimate responsive to detected events involving the physical object or area, the method 600 includes the computer system recognizing the occurrence of one or more types of activities directed to the physical object or area from processed data obtained via video analysis of video images corresponding to video monitoring of the physical object or area, and for each recognized activity: classifying the recognized activity as a dirtying activity or a cleaning activity, and changing the value of the cleanliness estimate according to the classification.

In at least one embodiment, the method 600 includes the computer system receiving the video images and performing the video analysis to obtain the processed data. That is, the computer system in one or more embodiments performs the video analysis. Alternatively, the computer system receives the processed data from an associated video analytics system that receives the video images and performs the video analysis.

For changing the value of the cleanliness estimate according to the classification, the method 600 according to an example implementation includes changing the value of the cleanliness estimate in a direction that corresponds to a dirtier condition of the physical object 38 or area 36, in response to the recognized activity being classified as a dirtying activity. For changing the value of the cleanliness estimate according to the classification, the method 600 in in or more embodiments includes changing the value of the cleanliness estimate in a direction that corresponds to a cleaner condition of the physical object 38 or area 36, in response to the recognized activity being classified as a cleaning activity. Changing the value of the cleanliness estimate in a direction that corresponds to a cleaner condition of the physical object or area may be performed, in at least some embodiments, only in response both to the recognized activity being classified as a cleaning activity along with receiving or detecting verification of the classification.

Implementing the method 600 comprises, for example, configuring a cleanliness monitoring system 10 to carry out the method operations. An example system 10 includes interface circuitry 14 and processing circuitry 12, where the processing circuitry 12 is configured to set a cleanliness estimate for a physical object 38 or area 36 to an initial value, change the value of the cleanliness estimate responsive to least one of the passage of time or detected events involving the physical object or area, and output, via the interface circuitry 14, an indication of the value of the cleanliness estimate.

The processing circuitry 12 may be configured to output the indication of the value of the cleanliness estimate as video overlay information, for overlaying a video or still image of the physical object 38 or area 36. The video overlay information comprises, for example, a color-coded graphical overlay, where the color of the color-coded graphical overlay indicates the value of the cleanliness estimate and where the processing circuitry 12 is configured to change the color of the color-coded graphical overlay responsive to changing the value of the cleanliness estimate. Additionally, or alternatively, the processing circuitry 12 is configured to output the indication of the value of the cleanliness estimate in one or more textual reports generated by the cleanliness monitoring system. That is, the processing circuitry 12 may be configured to output one or more types or forms of indication, to indicate the estimated cleanliness.

In one or more embodiments, the initial or starting value used by the processing circuitry 12 corresponds to a cleanest condition of the physical object 38 or area 36, according to a defined range of values or a defined set of values ranging from cleanest to dirtiest.

The processing circuitry 12 in one or more embodiments is configured to detect events involving the physical object or area by receiving and evaluating information incoming to the system 10 via the interface circuitry 14. The information comprises raw or processed sensor data. For each detected event, the processing circuitry 12 is configured to determine an event type and determine the change to the value of the cleanliness estimate in dependence on the determined event type.

For at least one event type, the processing circuitry 12 is configured to change the value of the cleanliness estimate further in dependence on an event duration or level of activity determined for each detected event of the at least one event type.

Defined event types include, for example, cleaning types of events and dirtying types of events. Correspondingly, the processing circuitry 12 is configured to change the value of the cleanliness estimate in a direction that corresponds to dirtier, in response to detecting dirtying events, and to change the value of the cleanliness estimate in a direction that corresponds to cleaner, in response to detecting cleaning events. The processing circuitry 12 may be configured to set the value of the cleanliness estimate to the initial value or other predetermined value, in response to detecting events of the cleaning type.

In one or more embodiments, the processing circuitry 12 is configured to change the value of the cleanliness estimate responsive to detected events involving the physical object 38 or area 36, based on being configured to: (a) recognize the occurrence of one or more types of activities directed to the physical object or area from processed data obtained via video analysis of video images corresponding to video monitoring of the physical object or area; and (b) for each recognized activity: (i) classify the recognized activity as a dirtying activity or a cleaning activity; and (ii) change the value of the cleanliness estimate according to the classification.

The processing circuitry 12 in at least one such embodiment is configured to receive the video images via the interface circuitry 14 and to perform the video analysis to obtain the processed data. Alternatively, the processing circuitry 12 is configured to receive the processed data via the interface circuitry 14, the processed data being provided by an associated video analytics processing system 30 that receives the video images and performs the video analysis. Of course, the processing circuitry 12 may be configured to handle both processed and unprocessed video data—e.g., it may include video-analytics processing and may also interface to external video-analytics processing systems having greater or different capabilities.

As an example of changing the value of the cleanliness estimate according to the classification of a detected event, the processing circuitry 12 may be configured to change the value of the cleanliness estimate in a direction that corresponds to a dirtier condition of the physical object 38 or area 36, in response to the recognized activity being classified as a dirtying activity. Additionally, the processing circuitry may be configured to change the value of the cleanliness estimate in a direction that corresponds to a cleaner condition of the physical object 38 or area 36, in response to the recognized activity being classified as a cleaning activity. However, in at least one implementation, the processing circuitry 12 requires verification of cleaning activities, e.g., it performs a verification or receives verification information, serving as verification that a detected activity was, in fact, a cleaning activity.

In another example of cleanliness-monitoring operations, the processing circuitry 12 in one or more embodiments of the system 10 is configured to: (a) initialize the value of a cleanliness estimate for a physical object 38 or area 36; (b) recognize cleaning activities and dirtying activities that occur over time and are directed to the physical object 38 or area 36, the recognition based on video analytics derived from video images associated with video monitoring of the physical object 38 or area 36; (c) for each recognized dirtying activity, change the value of the cleanliness estimate to reflect the recognized dirtying activity, unless the value is already at a limit reflecting a dirtiest condition of the physical object or area; and (d) output, via the interface circuitry 14, an indication of the current value of the cleanliness estimate.

Regardless of the particular implementation details, in one or more embodiments the system 10 may be configured to report to interested parties at any given time, information indicating the cleanliness state of monitored objects 38/areas 36.

Regarding FIGS. 5*a* and 5*b*, for example, a user may be presented with an image of area(s) 36 and/or object(s) 38 to be monitored, where the image may be overlayed by a grid that allows the user to mark the objects/areas, with the system 10 assigning corresponding tracking parameters, e.g., corresponding cleanliness estimates and associated information regarding types of activities, video-analytics parameters, aging parameters, etc.

The cleaning process consists of operations to drive the cleanliness state towards a cleaner state or condition. In order for the process of cleaning to drive the cleanliness state, the cleaning operation must be detectable. This detection can take many forms including noting of the process by the cleaning personnel or others observing the process in action or through automated means such as image processing and/or behavior detection through behavior detection/image processing of still images/video. A simple example might include marking an area as clean (a value of 100) when a janitor is observed wiping this area with a disinfectant. Here, the "observation" may be automated, for example, using video-analytics for automatic recognition of certain action or motions of a human or a cleaning system as being "cleaning" activities that restore a starting or defined state of cleanliness to the involved object(s).

The dirtying process consists of activities driving the cleanliness value toward a dirty state. In order for the process of dirtying to drive the cleanliness state, the dirtying operation must be detectable. This detection can take many forms including noting of the process by the cleaning personnel or others observing the process in action or through automated means such as image processing and/or behavior detection through behavior detection/image processing of still images/video. A simple example might include marking an area as dirty (e.g., a cleanliness value of 0 if a patient known to be ill touches this area, where "0" denotes a dirty or contaminated state).

The time process is defined such that as time progresses the cleanliness state is driven toward a clean or dirty state based on a selected formula/parameters. A simple example includes:

$$CS_{Now} = CS_{Previous} * 0.8 * ElapsedInterval$$

Where $CS_{Now}$=Cleanliness state now
$CS_{Previous}$=Cleanliness state previous
$CS_{Now}$=Current cleanliness state
Elapsed Interval=number of seconds between current time and last activity observance. Note that this formula will reduce cleanliness of an object 38 or area 36 as time progresses, representing the recognition that cleanliness tends to degrade over time, such as from airborne particles, the accumulation of dirt, etc. Far more complex formulas can be applied to the time process as required by various applications, and the system 10 in one or more embodiments is configured to use simpler or more complex aging formulas or more or less aggressive aging formulas, in dependence on user configuration, object types, default settings, etc.

In one or more embodiments of the system 10, the system 10 attaches a different "weight" or "weighting" to detected events, whether detected automatically via image processing and behavior detection, or detected manually via user input. Weighting of events can be used to reflect a probable accuracy of event detection, in terms of accurately detecting the event type, duration, level of activity, etc. Weighting detected events provides a mechanism for attenuating or amplifying the effect the event has on current value of the cleanliness estimate for the involved object 38 or area 36.

In addition to outputting indications of the cleanliness of objects 38 or areas 36, such as by outputting electronic reports—textual reports, for example—the system 10 may output alarms for values outside of defined bounds. Data associated with such reports can also be utilized for trending/predictions of future states allowing a user of the system 10 to modify cleaning/dirtying operations to better achieve a desired overall state. Further, regarding the output of overlay information, the system 10 may include or be communicatively coupled to a user display and may display a camera image that is augmented by cleanliness overlay information. Alternatively, it may output information from which video overlays may be generated. Possibilities include overlay of patterns and or callouts indicating actual values and how the values have changed over time, possibly including an expected time at which values are likely to be outside of defined bounds.

As noted, a fixed or video image may be used by a user to specify a map of areas and objects to be monitored. Different objects, such as different surfaces, can be given different classifications of types and importance for assigning cleaning-rate and dirtying-rate rules. The system 10 may store or represent objects 38 and/or areas 36 to be monitored in a digital map. Further, movable objects can be identified and the system 10 in one or more embodiments is configurable to generate alarms upon detecting that an object has been moved and/or recognizing moved objects in their new locations. Further, the system 10 may be configured to continuing monitor moved objects in their new locations and may maintain continuity of cleanliness tracking across the moves.

Also, as noted, cleanliness levels can be represented by color overlays on an image representing the scene being monitored, and cleanliness levels can have dissipation rates that can be specified by user. Here, a "dissipation rate" may be understood as the rate at which the cleanliness of an object 38 or area 36 decreases over time. The system 10 in one or more embodiments detects physical contact or touching of classified items—i.e., objects 38 or areas 36 being monitored—by humans or equipment, such as cleaning gear.

Contacts may be identified as positive/good contact or negative/bad contact, e.g., as cleaning contacts or dirtying contacts. Contact with classified surfaces can cause localized areas of cleanliness dissipation or building at greater levels. A lingering contact causes, for example, a stronger or broader localized areas of cleanliness dissipation or building at greater levels. Contact identified as positive, such as cleaning activity by a member performing a disinfecting wipe of the surface, can be used for resetting cleanliness to base/clean levels.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A cleanliness monitoring system comprising:
   interface circuitry; and
   processing circuitry configured to:
      set a cleanliness estimate for a physical object or area to an initial value;
      change the value of the cleanliness estimate responsive to least one of: the passage of time, or detected events involving the physical object or area; and
      output, via the interface circuitry, an indication of the value of the cleanliness estimate;
   wherein the processing circuitry is configured to detect events involving the physical object or area by receiving and evaluating information incoming to the cleanliness monitoring system via the interface circuitry, the information comprising raw or processed sensor data, and wherein, for each detected event, the processing circuitry is configured to determine an event type and to determine the change to the value of the cleanliness estimate in dependence on the determined event type; and
   wherein defined event types include cleaning types of events and dirtying types of events, and wherein the processing circuitry is configured to change the value of the cleanliness estimate in a direction that corresponds to dirtier, in response to detecting dirtying events, and to change the value of the cleanliness estimate in a direction that corresponds to cleaner, in response to detecting cleaning events.

2. The cleanliness monitoring system of claim 1, wherein the processing circuitry is configured to output the indication of the value of the cleanliness estimate as video overlay information, for overlaying a video or still image of the physical object or area.

3. The cleanliness monitoring system of claim 2, wherein the video overlay information comprises a color-coded graphical overlay, wherein the color of the color-coded graphical overlay indicates the value of the cleanliness estimate and wherein the processing circuitry is configured to change the color of the color-coded graphical overlay responsive to changing the value of the cleanliness estimate.

4. The cleanliness monitoring system of claim 1, wherein the processing circuitry is configured to output the indication of the value of the cleanliness estimate in one or more textual reports generated by the cleanliness monitoring system.

5. The cleanliness monitoring system of claim 1, wherein the initial value corresponds to a cleanest condition of the physical object or area, according to a defined range of values or a defined set of values ranging from cleanest to dirtiest.

6. The cleanliness monitoring system of claim 1, wherein, for at least one event type, the processing circuitry is configured to change the value of the cleanliness estimate further in dependence on an event duration or level of activity determined for each detected event of the at least one event type.

7. The cleanliness monitoring system of claim 1, wherein the processing circuitry is configured to set the value of the cleanliness estimate to the initial value or other predetermined value, in response to detecting events of the cleaning type.

8. A cleanliness monitoring system comprising:
interface circuitry; and
processing circuitry configured to:
set a cleanliness estimate for a physical object or area to an initial value;
change the value of the cleanliness estimate responsive to least one of: the passage of time, or detected events involving the physical object or area; and
output, via the interface circuitry, an indication of the value of the cleanliness estimate;
wherein the processing circuitry is configured to change the value of the cleanliness estimate responsive to detected events involving the physical object or area, based on being configured to:
recognize the occurrence of one or more types of activities directed to the physical object or area from processed data obtained via video analysis of video images corresponding to video monitoring of the physical object or area; and
for each recognized activity:
classify the recognized activity as a dirtying activity or a cleaning activity; and
change the value of the cleanliness estimate according to the classification.

9. The cleanliness monitoring system of claim 8, wherein the processing circuitry is configured to receive the video images via the interface circuitry and to perform the video analysis to obtain the processed data.

10. The cleanliness monitoring system of claim 8, wherein the processing circuitry is configured to receive the processed data via the interface circuitry, the processed data provided by an associated video analytics system that receives the video images and performs the video analysis.

11. The cleanliness monitoring system of claim 8, wherein, for changing the value of the cleanliness estimate according to the classification, the processing circuitry is configured to change the value of the cleanliness estimate in a direction that corresponds to a dirtier condition of the physical object or area, in response to the recognized activity being classified as a dirtying activity.

12. The cleanliness monitoring system of claim 8, wherein, for changing the value of the cleanliness estimate according to the classification, the processing circuitry is configured to change the value of the cleanliness estimate in a direction that corresponds to a cleaner condition of the physical object or area, in response to the recognized activity being classified as a cleaning activity.

13. The cleanliness monitoring system of claim 12, wherein the processing circuitry is configured to change the value of the cleanliness estimate in a direction that corresponds to a cleaner condition in joint dependence on the recognized activity being classified as a cleaning activity and on receiving or detecting a verification of the classification.

14. A cleanliness monitoring system comprising:
interface circuitry; and
processing circuitry configured to:
initialize the value of a cleanliness estimate for a physical object or area;
recognize cleaning activities and dirtying activities that occur over time and are directed to the physical object or area, the recognition based on video analytics derived from video images associated with video monitoring of the physical object or area;
for each recognized dirtying activity, change the value of the cleanliness estimate to reflect the recognized dirtying activity, unless the value is already at a limit reflecting a dirtiest condition of the physical object or area; and
output, via the interface circuitry, an indication of the current value of the cleanliness estimate.

15. A method performed by a computer system, the method comprising:
setting a cleanliness estimate for a physical object or area to an initial value;
changing the value of the cleanliness estimate responsive to least one of: the passage of time, or detected events involving the physical object or area; and
outputting an indication of the value of the cleanliness estimate;
wherein, to change the value of the cleanliness estimate responsive to detected events involving the physical object or area, the method includes the computer system:
recognizing the occurrence of one or more types of activities directed to the physical object or area from processed data obtained via video analysis of video images corresponding to video monitoring of the physical object or area; and
for each recognized activity:
classifying the recognized activity as a dirtying activity or a cleaning activity; and
changing the value of the cleanliness estimate according to the classification.

16. The method of claim 15, wherein outputting the indication of the value of the cleanliness estimate comprises outputting the indication of the value of the cleanliness estimate as video overlay information, for overlaying a video or still image of the physical object or area.

17. The method of claim 16, wherein the video overlay information comprises a color-coded graphical overlay, wherein the color of the color-coded graphical overlay indicates the value of the cleanliness estimate and wherein the method includes changing the color of the color-coded graphical overlay responsive to changing the value of the cleanliness estimate.

18. The method of claim 15, wherein the method includes the computer system receiving the video images and performing the video analysis to obtain the processed data.

19. The method of claim 15, wherein the method includes the computer system receiving the processed data from an associated video analytics system that receives the video images and performs the video analysis.

20. The method of claim 15, wherein, for changing the value of the cleanliness estimate according to the classification, the method comprises changing the value of the cleanliness estimate in a direction that corresponds to a dirtier condition of the physical object or area, in response to the recognized activity being classified as a dirtying activity.

21. The method of claim 15, wherein, for changing the value of the cleanliness estimate according to the classification, the method comprises changing the value of the cleanliness estimate in a direction that corresponds to a cleaner condition of the physical object or area, in response to the recognized activity being classified as a cleaning activity.

22. The method of claim 15, wherein, for changing the value of the cleanliness estimate according to the classification, the method comprises changing the value of the cleanliness estimate in a direction that corresponds to a cleaner condition of the physical object or area, in response both to the recognized activity being classified as a cleaning activity and receiving or detecting verification of the classification.

\* \* \* \* \*